US012387649B2

(12) United States Patent
Lee et al.

(10) Patent No.: US 12,387,649 B2
(45) Date of Patent: Aug. 12, 2025

(54) DISPLAY DEVICE FOR IMAGE-STICKING CORRECTING BY USER MANIPULATION

(71) Applicant: Samsung Display Co., Ltd., Yongin-si (KR)

(72) Inventors: Kyungsu Lee, Hwaseong-si (KR); Jong-Woong Park, Seongnam-si (KR); Wonju Shin, Cheonan-si (KR); Junhan Ko, Seoul (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 17/708,546

(22) Filed: Mar. 30, 2022

(65) Prior Publication Data

US 2022/0398961 A1 Dec. 15, 2022

(30) Foreign Application Priority Data

Jun. 11, 2021 (KR) ........................ 10-2021-0076279

(51) Int. Cl.
*G09G 3/20* (2006.01)

(52) U.S. Cl.
CPC ... *G09G 3/2003* (2013.01); *G09G 2320/0666* (2013.01); *G09G 2354/00* (2013.01)

(58) Field of Classification Search
None
See application file for complete search history.

(56) References Cited

U.S. PATENT DOCUMENTS

| | | | | |
|---|---|---|---|---|
| 7,675,492 B2 | 3/2010 | Park et al. | | |
| 8,922,595 B2 | 12/2014 | Ahn et al. | | |
| 10,803,800 B2 | 10/2020 | An | | |
| 2005/0104874 A1* | 5/2005 | Koh | G09G 3/20 | 345/204 |
| 2007/0177058 A1* | 8/2007 | Jang | G09G 3/20 | 348/173 |
| 2009/0295827 A1* | 12/2009 | Mizuno | G09G 3/3611 | 345/619 |
| 2010/0245228 A1 | 9/2010 | Chen et al. | | |

(Continued)

FOREIGN PATENT DOCUMENTS

| | | |
|---|---|---|
| EP | 2991064 A2 | 3/2016 |
| JP | 2014191180 A | 10/2014 |

(Continued)

*Primary Examiner* — Benjamin C Lee
*Assistant Examiner* — Emily J Frank
(74) *Attorney, Agent, or Firm* — CANTOR COLBURN LLP

(57) ABSTRACT

An electronic device includes a main processor that provides an image signal and an image-sticking correction signal, and a display module that receives the image signal and the image-sticking correction signal and outputs an image data signal obtained by compensating for the image signal. The display module includes a compensation circuit that calculates cumulative stress based on the image data signal and outputs an image-sticking compensation signal and a compensation adjuster that outputs the image data signal obtained by correcting the image signal based on the image-sticking correction signal and the image-sticking compensation signal. The image-sticking correction signal is input by a user manipulation.

25 Claims, 12 Drawing Sheets

(56) References Cited

U.S. PATENT DOCUMENTS

| | | | | |
|---|---|---|---|---|
| 2016/0063954 | A1 * | 3/2016 | Ryu | G09G 3/20 345/589 |
| 2016/0335965 | A1 * | 11/2016 | Huang | G09G 3/3208 |
| 2019/0043423 | A1 * | 2/2019 | Azam | G09G 3/3233 |
| 2019/0279598 | A1 * | 9/2019 | Mito | H04N 1/622 |
| 2020/0388215 | A1 * | 12/2020 | Kam | G09G 3/3291 |
| 2021/0056912 | A1 * | 2/2021 | Park | G09G 3/2092 |
| 2021/0103372 | A1 * | 4/2021 | Scheffler | G06F 3/0488 |
| 2022/0223104 | A1 * | 7/2022 | Sun | G09G 3/3208 |
| 2022/0309982 | A1 * | 9/2022 | Wu | G09G 3/2003 |

FOREIGN PATENT DOCUMENTS

| | | | |
|---|---|---|---|
| KR | 101871195 | B1 | 6/2018 |
| KR | 1020190030534 | A | 3/2019 |
| KR | 1020190062652 | A | 6/2019 |
| KR | 1020210022824 | A | 3/2021 |
| WO | 2016182681 | A1 | 11/2016 |

* cited by examiner

DISPLAY DEVICE FOR IMAGE-STICKING CORRECTING BY USER MANIPULATION

This application claims priority to Korean Patent Application No. 10-2021-0076279, filed on Jun. 11, 2021, and all the benefits accruing therefrom under 35 U.S.C. § 119, the content of which in its entirety is herein incorporated by reference.

BACKGROUND

1. Field

Embodiments of the invention described herein relate to an electronic device, and more particularly, relate to an electronic device including a display module.

2. Description of Related Art

Multimedia electronic devices such as a television ("TV"), a mobile phone, a tablet personal computer ("PC"), a computer, a navigation device, a game console, or the like, include a display module that displays an image.

An organic light-emitting display device among display devices displays an image by an organic light-emitting diode ("OLED") that generates light by the recombination of electrons and holes. The organic light-emitting display device has a fast response speed and is driven with low power consumption.

The organic light-emitting display device includes pixels connected to data lines and scan lines. In general, the pixels include the OLED and a circuit that controls an amount of current flowing into the OLED. The OLED generates light of a predetermined luminance corresponding to the amount of the current transmitted from the circuit.

SUMMARY

Embodiments of the invention provide an electronic device capable of compensating for and correcting the deterioration of a pixel, and an operating method thereof.

In an embodiment of the invention, an electronic device includes a main processor that provides an image signal and an image-sticking correction signal and a display module that receives the image signal and the image-sticking correction signal and outputs an image data signal obtained by compensating for the image signal. The display module includes a compensation circuit that outputs an image-sticking compensation signal and a compensation adjuster that outputs the image data signal obtained by correcting the image signal based on the image-sticking correction signal and the image-sticking compensation signal. The image-sticking correction signal is input by a user manipulation.

In an embodiment, the compensation circuit may calculate cumulative stress based on the image data signal and output the image-sticking compensation signal corresponding to the cumulative stress. The display module may further include a memory storing the cumulative stress.

In an embodiment, the compensation circuit may include a stress calculator that calculates pixel stress based on the image data signal and a compensator that calculates the image-sticking compensation signal based on the pixel stress and the cumulative stress.

In an embodiment, the memory may include a first memory and a second memory. The compensator may store a sum of the pixel stress and initial cumulative stress stored in the second memory, as the cumulative stress, in the second memory. The compensator may periodically store the cumulative stress in the first memory.

In an embodiment, the first memory may be a flash memory. The second memory may be a static random access memory ("SRAM").

In an embodiment, the compensation adjuster may store the image-sticking correction signal in the first memory.

In an embodiment, the image-sticking correction signal may further include user manipulation information. The compensation adjuster may store the image-sticking correction signal including the user manipulation information in the first memory.

In an embodiment, the stress calculator may calculate the pixel stress based on the image data signal and external environment information.

In an embodiment, the compensation adjuster may output the image data signal obtained by correcting the image signal based on a compensation value. The compensation value may be calculated based on a following equation:

$$CV = \text{COMP} \times (CC/AR),$$

where CV denotes the compensation value, COMP denotes the image-sticking compensation signal, CC denotes the image-sticking correction signal, and AR denotes a correction reference value.

In an embodiment, the image-sticking correction signal may include a first correction signal corresponding to a first color.

In an embodiment of the invention, a display device includes a display panel including a pixel, a driving controller that receives an image signal and an image-sticking correction signal and to output an image data signal obtained by compensating for the image signal, and a data driving circuit that provides the pixel with a data signal corresponding to the image data signal. The driving controller includes a compensation circuit that outputs an image-sticking compensation signal and a compensation adjuster that outputs the image data signal obtained by correcting the image signal based on the image-sticking correction signal and the image-sticking compensation signal.

In an embodiment, the compensation circuit may calculate cumulative stress based on the image data signal and output the image-sticking compensation signal corresponding to the cumulative stress. The driving controller may further include a memory storing the cumulative stress.

In an embodiment, the compensation circuit may include a stress calculator that calculates pixel stress based on the image data signal and a compensator that calculates the image-sticking compensation signal based on the pixel stress and the cumulative stress.

In an embodiment, the memory may include a first memory and a second memory. The compensator may store a sum of the pixel stress and initial cumulative stress stored in the second memory, as final cumulative stress, in the second memory. The compensator may periodically store the cumulative stress in the first memory.

In an embodiment, the image-sticking correction signal may further include user manipulation information. The compensation adjuster may store the image-sticking correction signal including the user manipulation information in the first memory.

In an embodiment, the compensation adjuster may output the image data signal obtained by correcting the image signal based on a compensation value. The compensation value may be calculated based on a following equation:

$$CV = \text{COMP} \times (CC/AR),$$

where CV denotes the compensation value, COMP denotes the image-sticking compensation signal, CC denotes the image-sticking correction signal, and AR denotes a correction reference value.

In an embodiment of the invention, an operating method of an electronic device includes receiving image-sticking correction information by a user manipulation, providing a display module with an image signal and an image-sticking correction signal corresponding to the image-sticking correction information, outputting an image-sticking compensation signal, outputting an image data signal obtained by compensating for the image signal based on the image-sticking correction signal and the image-sticking compensation signal, and displaying an image corresponding to the image data signal.

In an embodiment, the receiving the image-sticking correction information may include displaying an image-sticking compensation image in the display module, displaying at least one color pattern selected by a user in the display module, and receiving the image-sticking correction information.

In an embodiment, the outputting the image data signal may include calculating pixel stress based on the image data signal, calculating cumulative stress corresponding to a sum of the pixel stress and initial cumulative stress stored in a memory, and calculating the image-sticking compensation signal corresponding to the cumulative stress, and outputting the image data signal obtained by compensating for the image signal based on the image-sticking correction signal and the image-sticking compensation signal.

In an embodiment, the memory may include a first memory and a second memory. The calculating the cumulative stress may include storing the sum of the pixel stress and the initial cumulative stress stored in the second memory, as the cumulative stress, in the second memory and periodically storing the cumulative stress in the first memory.

In an embodiment, the first memory may be a flash memory. The second memory may be an SRAM.

In an embodiment, the operating method of the electronic device may further include storing the image-sticking correction signal in the first memory.

In an embodiment, the image-sticking correction signal may further include user manipulation information. The operating method of the electronic device may further include storing the image-sticking correction signal including the user manipulation information in the first memory.

In an embodiment, the calculating the pixel stress may include calculating the cumulative stress based on the image data signal and external environment information.

In an embodiment, the outputting the image data signal may include outputting the image data signal obtained by correcting the image signal based on a compensation value. The compensation value may be calculated based on a following equation:

$$CV=\text{COMP}\times(CC/AR),$$

where CV denotes the compensation value, COMP denotes the image-sticking compensation signal, CC denotes the image-sticking correction signal, and AR denotes a correction reference value.

In an embodiment, the image-sticking correction signal may include a correction signal corresponding to the at least one color pattern.

BRIEF DESCRIPTION OF THE DRAWINGS

The above and other advantages and features of the invention will become apparent by describing in detail embodiments thereof with reference to the accompanying drawings.

DETAILED DESCRIPTION

Figure 1:
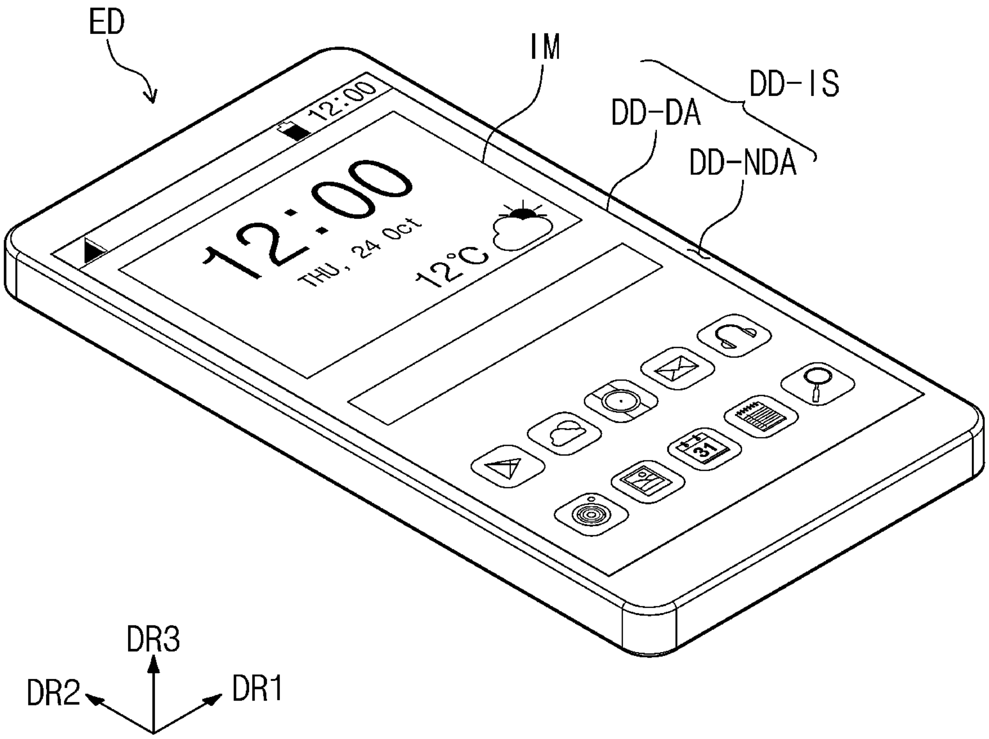
FIG. 1 is a perspective view of an embodiment of an electronic device, according to the invention.

In the specification, when one component (or area, layer, part, or the like) is referred to as being “on”, “connected to”, or “coupled to” another component, it should be understood that the former may be directly on, connected to, or coupled to the latter, and also may be on, connected to, or coupled to the latter via a third intervening component.

Like reference numerals refer to like components. Also, in drawings, the thickness, ratio, and dimension of components are exaggerated for effectiveness of description of technical contents. The term “and/or” includes one or more combinations of the associated listed items.

The terms “first”, “second”, etc. are used to describe various components, but the components are not limited by the terms. The terms are used only to differentiate one component from another component. For example, a first component may be named as a second component, and vice versa, without departing from the spirit or scope of the invention. A singular form, unless otherwise stated, includes a plural form.

Also, the terms “under”, “beneath”, “on”, “above”, etc. are used to describe a relationship between components illustrated in a drawing. The terms are relative and are described with reference to a direction indicated in the drawing.

It will be understood that the terms “include”, “comprise”, “have”, etc. specify the presence of features, numbers, steps, operations, elements, or components, described in the specification, or a combination thereof, not precluding the presence or additional possibility of one or more other features, numbers, steps, operations, elements, or components or a combination thereof.

“About” or “approximately” as used herein is inclusive of the stated value and means within an acceptable range of deviation for the particular value as determined by one of ordinary skill in the art, considering the measurement in question and the error associated with measurement of the particular quantity (i.e., the limitations of the measurement system). The term "about" can mean within one or more standard deviations, or within ±30%, 20%, 10%, 5% of the stated value, for example.

Unless otherwise defined, all terms (including technical terms and scientific terms) used in this specification have the same meaning as commonly understood by those skilled in the art to which the disclosure belongs. Furthermore, terms such as terms defined in commonly used dictionaries should be interpreted as having a meaning consistent with the meaning in the context of the related technology, and should not be interpreted in an overly ideal or overly formal sense unless explicitly defined herein. Terms such as "module" or "part" may mean a hardware component such as a circuitry block, for example.

Hereinafter, embodiments of the invention will be described with reference to accompanying drawings.

FIG. 1 is a perspective view of an embodiment of an electronic device ED, according to the invention.

As illustrated in FIG. 1, the electronic device ED may display an image IM through a display surface DD-IS. The display surface DD-IS is parallel to a surface defined by a first direction axis DR1 and a second direction axis DR2. A normal direction of the display surface DD-IS, that is, a thicknesses direction of the electronic device ED corresponds to a third direction axis DR3.

A front surface (or an upper surface) and a back surface (or a lower surface) of each part or member described below are defined by the third direction axis DR3. However, the first to third direction axes DR1, DR2, and DR3 illustrated in an embodiment are only examples. Hereinafter, first to third directions are defined as directions indicated by the first, second, and third direction axes DR1, DR2, and DR3, respectively. The first to third directions are marked by the same reference symbols.

The electronic device ED including a flat display surface is illustrated in an embodiment of the invention. However, the invention is not limited thereto. The electronic device ED may further include a curved display surface. The electronic device ED may include a three-dimensional ("3D") display surface. The 3D display surface may include a plurality of display areas facing in different directions, respectively. In an embodiment, the 3D display surface may include a polygonal columnar display surface, for example.

The electronic device ED in an embodiment of the invention may be a rigid display device. However, the invention is not limited thereto. In an embodiment, the electronic device ED may be a flexible display device, for example. In an embodiment, the flexible display device may include a foldable display device, a bending-type display device where a partial area is bent, or a slidable display device.

In an embodiment, FIG. 1 illustrates a mobile phone terminal as an embodiment of the electronic device ED. In an embodiment of the invention, the electronic device ED may be a small and medium-sized electronic device, such as a tablet personal computer ("PC"), a vehicle navigation system, a game console, a smart watch, or the like as well as a large-sized electronic device, such as a television, a monitor, or the like. That is, the invention may be applied to all devices including a display device capable of displaying an image.

As illustrated in FIG. 1, the display surface DD-IS includes an image area DD-DA, in which the image IM is displayed, and a bezel area DD-NDA adjacent to the image area DD-DA. The bezel area DD-NDA refers to an area where an image is not displayed. FIG. 1 illustrates a clock and icon images as an embodiment of the image IM.

As illustrated in FIG. 1, the image area DD-DA may have a substantially-quadrangular (e.g., substantially-rectangular) shape. The "substantially-quadrangular (e.g., substantially-rectangular) shape" includes not only a quadrangular (e.g., rectangular) shape defined mathematically, but also a quadrangular (e.g., rectangular) shape in which a boundary of a curve is defined without defining a vertex in a vertex area (or a corner area).

The bezel area DD-NDA may surround the image area DD-DA. However, the invention is not limited thereto. In an embodiment, the image area DD-DA and the bezel area DD-NDA may be designed in different shapes, for example. In another embodiment, the bezel area DD-NDA may be disposed on only one side of the image area DD-DA. In an embodiment, the bezel area DD-NDA may not be exposed to the outside depending on the coupled shape of the electronic device ED and another component of an electronic device (not illustrated).

Figure 2:
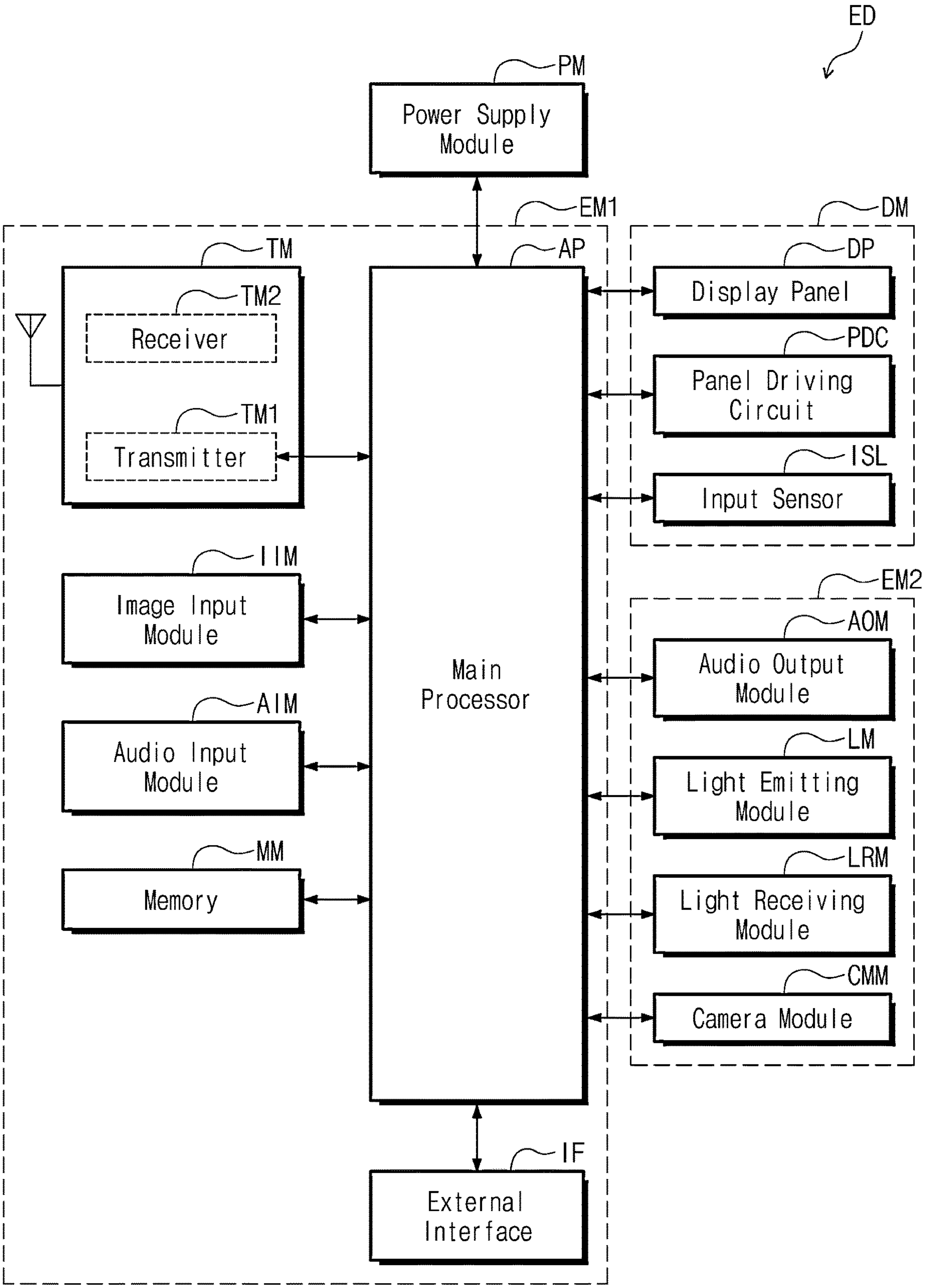
FIG. 2 is a block diagram of the electronic device shown in FIG. 1.

FIG. 2 is a block diagram of the electronic device shown in FIG. 1.

Referring to FIG. 2, the electronic device ED may include a display module DM, a power supply module PM, a first electronic module EM1, and a second electronic module EM2. The display module DM, the power supply module PM, the first electronic module EM1, and the second electronic module EM2 may be electrically connected to one another.

The display module DM may include a display panel DP and a panel driving circuit PDC. In an embodiment, the display module DM may further include an input sensor ISL for sensing a touch input by an input device such as a user's body or an electronic instrument (e.g., pen) and/or body information (e.g., a fingerprint) of a user. The input sensor ISL may be disposed on the display panel DP. The display module DM may be also referred to as a "display device".

The power supply module PM supplies power necessary for overall operations of the display module DM. The power supply module PM may include a general battery module.

Each of the first electronic module EM1 and the second electronic module EM2 includes various functional modules for operating the display module DM. The first electronic module EM1 may be directly disposed (e.g., mounted) on a motherboard electrically connected to the display module DM or may be disposed (e.g., mounted) on a separate board so as to be electrically connected to the motherboard through a connector (not illustrated).

The first electronic module EM1 may include a main processor AP, a wireless communication module TM, an image input module IIM, an audio input module AIM, a memory MM, and an external interface IF. Some of the modules may be electrically connected to the motherboard through a flexible circuit board without being disposed (e.g., mounted) on the motherboard.

The main processor AP controls overall operations of the display module DM. The main processor AP may be a microprocessor. In an embodiment, the main processor AP activates or deactivates the display module DM, for example. In an embodiment, the main processor AP may control other modules such as the image input module IIM or the audio input module AIM based on a touch signal received from the display module DM. In an embodiment, the main processor AP may perform user authentication based on a fingerprint signal received from a fingerprint readout circuit.

In an embodiment, the wireless communication module TM may transmit/receive a wireless signal with another terminal by wireless communication such as Bluetooth or Wi-Fi. The wireless communication module TM may transmit/receive a voice signal with a repeater by a communication line. The wireless communication module TM includes a transmitter TM1, which modulates and transmits a signal to be transmitted, and a receiver TM2 that demodulates a received signal.

The image input module IIM converts an image signal into image data capable of being displayed on the display module DM. The audio input module AIM receives an external sound signal from a microphone in a recording mode and a speech recognition mode, or the like and then converts the external sound signal into electrical voice data.

In an embodiment, the external interface IF operates as an interface that connects to an external charger, a wired/wireless data port, a card socket (e.g., a memory card, a subscriber identity module ("SIM")/user identity module ("UIM") card, or the like), or the like.

The second electronic module EM2 may include an audio output module AOM, a light-emitting module LM, a light-receiving module LRM, and a camera module CMM. The configurations may be disposed (e.g., mounted) directly on a motherboard, may be disposed (e.g., mounted) on a separate board so as to be electrically connected to the display module DM through a connector (not illustrated), or may be electrically connected to the first electronic module EM1.

The audio output module AOM converts audio data received from the wireless communication module TM or audio data stored in the memory MM and then may output the converted data to the outside.

The light-emitting module LM generates and outputs light. The light-emitting module LM may output infrared rays. The light-emitting module LM may include a light-emitting diode ("LED") element. The light-receiving module LRM may detect infrared rays. When the infrared rays having a predetermined level or more are detected, the light-receiving module LRM may be activated. The light-receiving module LRM may include a CMOS sensor. After infrared light being generated by the light-emitting module LM is output, the infrared light is reflected by an external object (e.g., a user's finger or face), and then the reflected infrared light may be incident on the light-receiving module LRM. The camera module CMM captures an external image.

Figure 3:
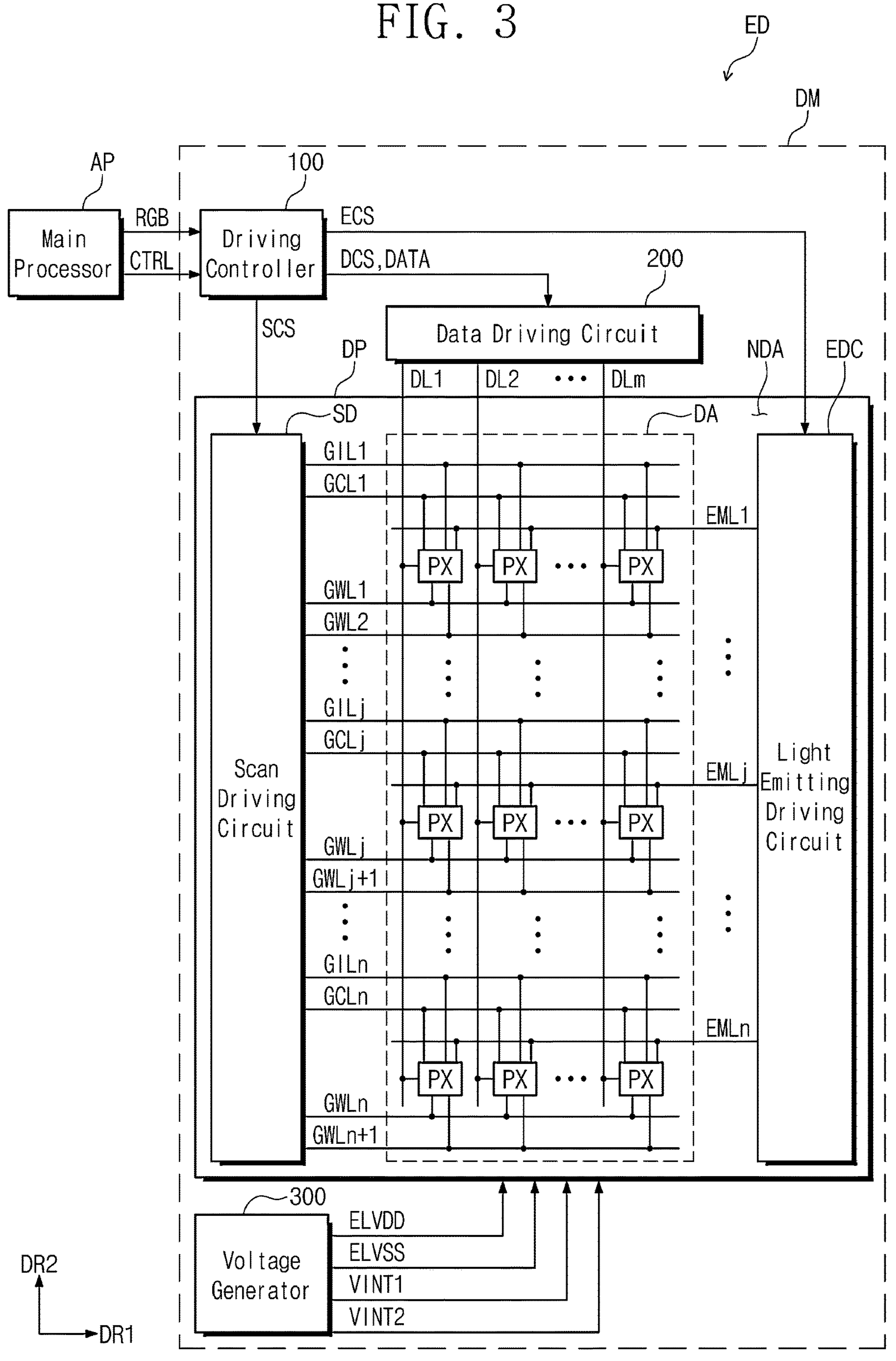
FIG. 3 is a block diagram illustrating an embodiment of a configuration of a display module of an electronic device, according to the invention.

FIG. 3 is a block diagram illustrating an embodiment of a configuration of a display module of an electronic device, according to the invention.

Referring to FIG. 3, the electronic device ED includes the main processor AP and the display module DM.

The main processor AP may provide an image signal RGB and a control signal CTRL to the display module DM.

The display module DM includes the display panel DP, a driving controller 100, a data driving circuit 200, and a voltage generator 300.

The driving controller 100 and the data driving circuit 200 are separated in FIG. 3, but the invention is not limited thereto. In another embodiment, the driving controller 100 and the data driving circuit 200 may be implemented as a single integrated circuit, for example.

The driving controller 100 receives the image signal RGB and the control signal CTRL. The driving controller 100 generates image data signal DATA by converting a data format of the image signal RGB so as to be suitable for the interface specification of the data driving circuit 200. In an embodiment, the driving controller 100 may output the image data signal DATA obtained by compensating for and correcting the image signal RGB to compensate for the deterioration of a pixel PX. The driving controller 100 outputs a scan control signal SCS, a data control signal DCS, and a light-emitting control signal ECS.

The data driving circuit 200 receives the data control signal DCS and the image data signal DATA from the driving controller 100. The data driving circuit 200 converts the image data signal DATA into data signals and then outputs the data signals to a plurality of data lines DL1 to DLm to be described below. The data signals are analog voltages corresponding to grayscale values of the image data signal DATA.

The voltage generator 300 generates voltages necessary to operate the display panel DP. In an embodiment, the voltage generator 300 generates a first driving voltage ELVDD, a second driving voltage ELVSS, a first initialization voltage VINT1, and a second initialization voltage VINT2.

The display panel DP includes scan lines GIL1 to GILn, GCL1 to GCLn, and GWL1 to GWLn+1, light-emitting control lines EML1 to EMLn, the data lines DL1 to DLm and the pixels PX. Here, n and m may be natural numbers. The display panel DP may further include a scan driving circuit SD and a light-emitting driving circuit EDC.

The scan driving circuit SD, the light-emitting driving circuit EDC, the driving controller 100, the data driving circuit 200, and the voltage generator 300 may be included in the panel driving circuit PDC illustrated in FIG. 2.

The display panel DP may be divided into a display area DA and a peripheral area NDA. The display area DA may be an area in which an image is displayed, and may correspond to the image area DD-DA of the electronic device ED shown in FIG. 1. The pixels PX are arranged in the display area DA.

The peripheral area NDA may be adjacent to the display area DA and may correspond to the bezel area DD-NDA of the electronic device ED shown in FIG. 1. The scan driving circuit SD and the light-emitting driving circuit EDC may be disposed in the peripheral area NDA.

In an embodiment, the scan driving circuit SD may be arranged on a first side (e.g., left side in FIG. 3) of the display panel DP. The scan lines GIL1 to GILn, GCL1 to GCLn, and GWL1 to GWLn+1 extend from the scan driving circuit SD in the first direction DR1.

The light-emitting driving circuit EDC is arranged on a second side (e.g., right side in FIG. 3) of the display panel DP. The light-emitting control lines EML1 to EMLn extend from the light-emitting driving circuit EDC in a direction opposite to the first direction DR1.

The scan lines GIL1 to GILn, GCL1 to GCLn, and GWL1 to GWLn+1 and the light-emitting control lines EML1 to EMLn are arranged to be spaced from one another in the second direction DR2. The data lines DL1 to DLm extend from the data driving circuit 200 in a direction opposite to the second direction DR2, and are arranged spaced from one another in the first direction DR1.

In the embodiment shown in FIG. 3, the scan driving circuit SD and the light-emitting driving circuit EDC are arranged to face each other with the pixels PX interposed therebetween, but the invention is not limited thereto. In an embodiment, the scan driving circuit SD and the light-emitting driving circuit EDC may be disposed adjacent to each other on one of the first side and the second side of the display panel DP, for example. In an embodiment, the scan driving circuit SD and the light-emitting driving circuit EDC may be implemented with one circuit.

The plurality of pixels PX is electrically connected to corresponding scan lines of the scan lines GIL1 to GILn, GCL1 to GCLn, and GWL1 to GWLn+1, a corresponding light-emitting control line of the light-emitting control lines EML1 to EMLn, and a corresponding data line of the data lines DL1 to DLm. Each of the plurality of pixels PX may be electrically connected to four scan lines and one light-emitting control line. In an embodiment, as shown in FIG. 3, pixels PX in a first row may be connected to the scan lines GIL1, GCL1, GWL1, and GWL2 and the light-emitting control line EML1, for example. Furthermore, pixels PX in a j-th row may be connected to the scan lines GILj, GCLj, GWLj, and GWLj+1 and the light-emitting control line EMLj. Here, j may be a natural number less than n.

Connections between the pixels PX shown in FIG. 3 and the scan lines and connections between the pixels PX shown in FIG. 3 and the light-emitting control lines are only an example, and the invention is not limited thereto. That is, the number of scan lines connected to the pixels PX and the number of light-emitting control lines connected to the pixels PX may be variously changed.

Each of the plurality of pixels PX includes an LED LD (refer to FIG. 4) and a pixel circuit PXC (refer to FIG. 4) for controlling the light emission of the LED LD. The pixel circuit PXC may include one or more transistors and one or more capacitors. The scan driving circuit SD and the light-emitting driving circuit EDC may include transistors formed or provided through the same process as that of the pixel circuit PXC.

Each of the plurality of pixels PX receives the first driving voltage ELVDD, the second driving voltage ELVSS, the first initialization voltage VINT1, and the second initialization voltage VINT2 from the voltage generator 300.

The scan driving circuit SD receives the scan control signal SCS from the driving controller 100. The scan driving circuit SD may output scan signals to the scan lines GIL1 to GILn, GCL1 to GCLn, and GWL1 to GWLn+1 in response to the scan control signal SCS.

Figure 4:
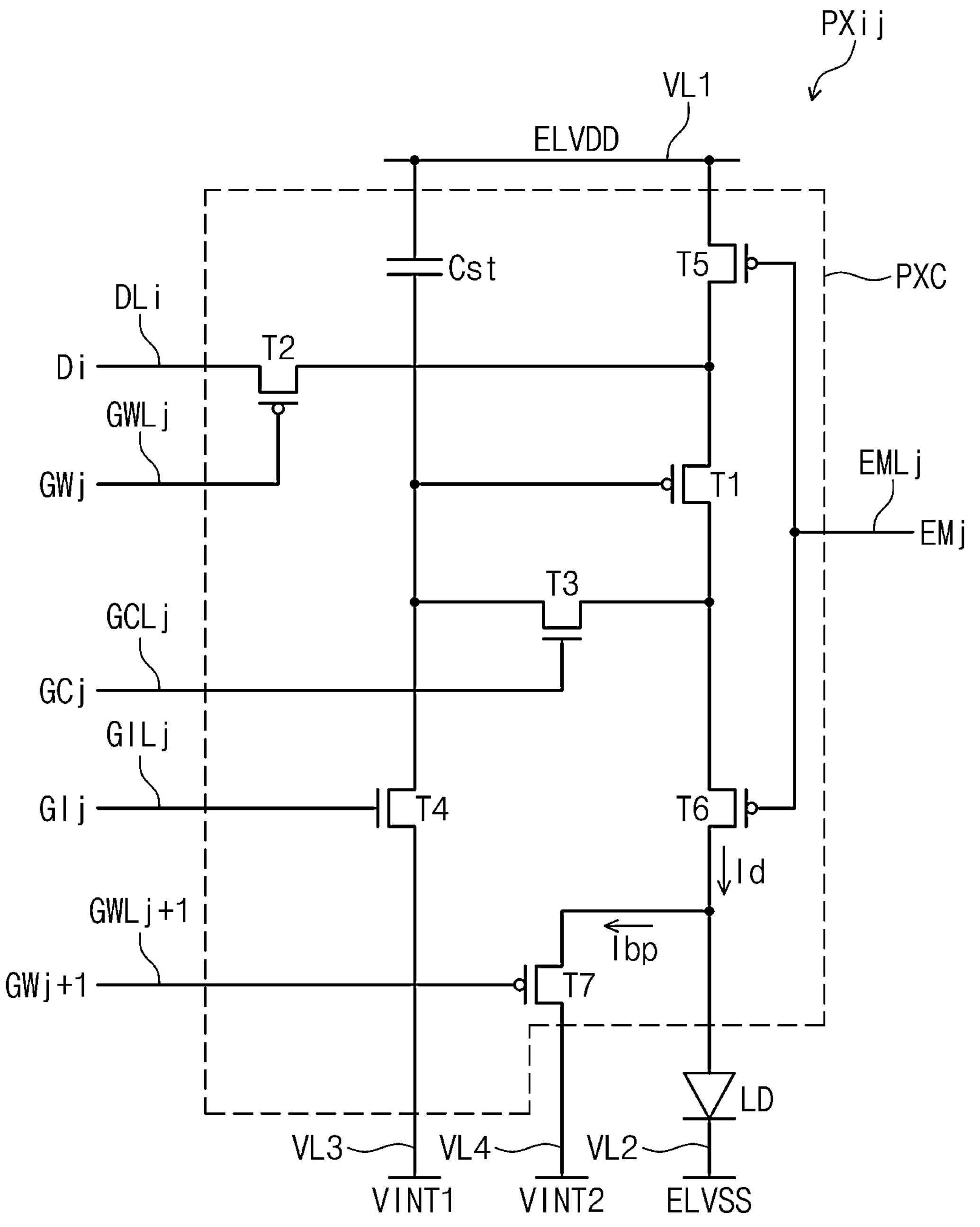
FIG. 4 is an equivalent circuit diagram of an embodiment of a pixel, according to the invention.

FIG. 4 is an equivalent circuit diagram of an embodiment of a pixel, according to the invention.

FIG. 4 illustrates an equivalent circuit diagram of a pixel PXij connected to the i-th data line DLi (i is a natural number equal to or less than m) among the data lines DL1 to DLm, the j-th scan lines GILj, GCLj, and GWLj and the (j+1)-th scan line GWLj+1 among the scan lines GIL1 to GILn, GCL1 to GCLn, and GWL1 to GWLn+1, and the j-th light-emitting control line EMLj among the light-emitting control lines EML1 to EMLn, which are illustrated in FIG. 3.

Each of the plurality of pixels PX shown in FIG. 3 may have the same circuit configuration as the equivalent circuit diagram of the pixel PXij shown in FIG. 4.

Referring to FIG. 4, the pixel PXij of a display device in an embodiment includes first to seventh transistors T1, T2, T3, T4, T5, T6, and T7, a capacitor Cst, and at least one LED LD. In an illustrated embodiment, the one pixel PXij may include one LED LD. However, the invention is not limited thereto, and a number of the LED LD may be different based on a structure of the pixel circuit PXC.

In an embodiment, the third and fourth transistors T3 and T4 among the first to seventh transistors T1 to T7 are N-type transistors including an oxide semiconductor as a semiconductor layer. Each of the first, second, fifth, sixth, and seventh transistors T1, T2, T5, T6, and T7 is a P-type transistor having a low-temperature polycrystalline silicon ("LTPS") semiconductor layer. However, the invention is not limited thereto, and all of the first to seventh transistors T1 to T7 may be P-type transistors or N-type transistors. In another embodiment, at least one of the first to seventh transistors T1 to T7 may be an N-type transistor, and the remaining transistors may be P-type transistors. Moreover, the circuit configuration of a pixel in an embodiment of the invention is not limited to FIG. 4. The pixel circuit PXC illustrated in FIG. 4 is only an example. In an embodiment, the configuration of the pixel circuit PXC may be modified and implemented, for example.

The scan lines GILj, GCLj, GWLj, and GWLj+1 may transmit scan signals GIj, GCj, GWj, and GWj+1, respectively. The light-emitting control line EMLj may transmit a light-emitting signal EMj. The data line DLi transmits a data signal Di. The data signal Di may have a voltage level corresponding to the image signal RGB to be input to the display module DM (refer to FIG. 3). First to fourth driving voltage lines VL1, VL2, VL3, and VL4 may transmit the first driving voltage ELVDD, the second driving voltage ELVSS, the first initialization voltage VINT1, and the second initialization voltage VINT2.

The first transistor T1 includes a first electrode connected to the first driving voltage line VL1 via the fifth transistor T5, a second electrode electrically connected to an anode of the LED LD via the sixth transistor T6, and a gate electrode connected to one end of the capacitor Cst. The first transistor T1 may receive the data signal Di transmitted by the data line DLi depending on the switching operation of the second transistor T2 and then may supply a driving current Id to the LED LD.

The second transistor T2 includes a first electrode connected to the data line DLi, a second electrode connected to the first electrode of the first transistor T1, and a gate electrode connected to the scan line GWLj. The second transistor T2 may be turned on depending on the scan signal GWj received through the scan line GWLj and then may transmit the data signal Di transmitted from the data line DLi to the first electrode of the first transistor T1.

The third transistor T3 includes a first electrode connected to the gate electrode of the first transistor T1, a second electrode connected to the second electrode of the first transistor T1, and a gate electrode connected to the scan line GCLj. The third transistor T3 may be turned on depending on the scan signal GCj received through the scan line GCLj, and thus, the gate electrode and the second electrode of the first transistor T1 may be connected, that is, the first transistor T1 may be diode-connected.

The fourth transistor T4 includes a first electrode connected to the gate electrode of the first transistor T1, a second electrode connected to the third driving voltage line VL3 through which the first initialization voltage VINT1 is supplied, and a gate electrode connected to the scan line GILj. The fourth transistor T4 may be turned on depending on the scan signal GIj received through the scan line GILj and then may perform an initialization operation of initializing a voltage of the gate electrode of the first transistor T1 by supplying the first initialization voltage VINT1 to the gate electrode of the first transistor T1.

The fifth transistor T5 includes a first electrode connected to the first driving voltage line VL1, a second electrode connected to the first electrode of the first transistor T1, and a gate electrode connected to the light-emitting control line EMLj.

The sixth transistor T6 includes a first electrode connected to the second electrode of the first transistor T1, a second electrode connected to the anode of the LED LD, and a gate electrode connected to the light-emitting control line EMLj.

The fifth transistor T5 and the sixth transistor T6 may be simultaneously turned on depending on the light-emitting signal EMj received through the light-emitting control line EMLj. In this way, the first driving voltage ELVDD may be compensated through the diode-connected first transistor T1 and may be supplied to the LED LD.

The seventh transistor T7 includes a first electrode connected to the second electrode of the sixth transistor T6, a second electrode connected to the fourth driving voltage line VL4, and a gate electrode connected to the scan line GWLj+1. The seventh transistor T7 is turned on depending on the scan signal GWj+1 received through the scan line GWLj+1, and bypasses a current Ibp of the anode of the LED LD to the fourth driving voltage line VL4.

As described above, one end of the capacitor Cst is connected to the gate electrode of the first transistor T1, and the other end of the capacitor Cst is connected to the first driving voltage line VL1. A cathode of the LED LD may be connected to the second driving voltage line VL2 that transmits the second driving voltage ELVSS.

When the first, fifth, and sixth transistors T1, T5, and T6 are turned on, the driving current Id corresponding to a voltage level of the gate electrode of the first transistor T1 may be provided to the LED LD. The LED LD may emit light with a luminance corresponding to the driving current Id.

When emitting light for a long time, the LED LD may be deteriorated. The first to seventh transistors T1 to T7 may also be deteriorated when being operated for a long time. Besides, in an embodiment, the deterioration of the LED LD and the first to seventh transistors T1 to T7 may be affected by surrounding environments such as ambient temperature, ambient brightness, or the like as well as an operating time. When the feature of the pixel PXij is deteriorated, an image sticking phenomenon that a previous image affects the next image may appear.

Figure 5:
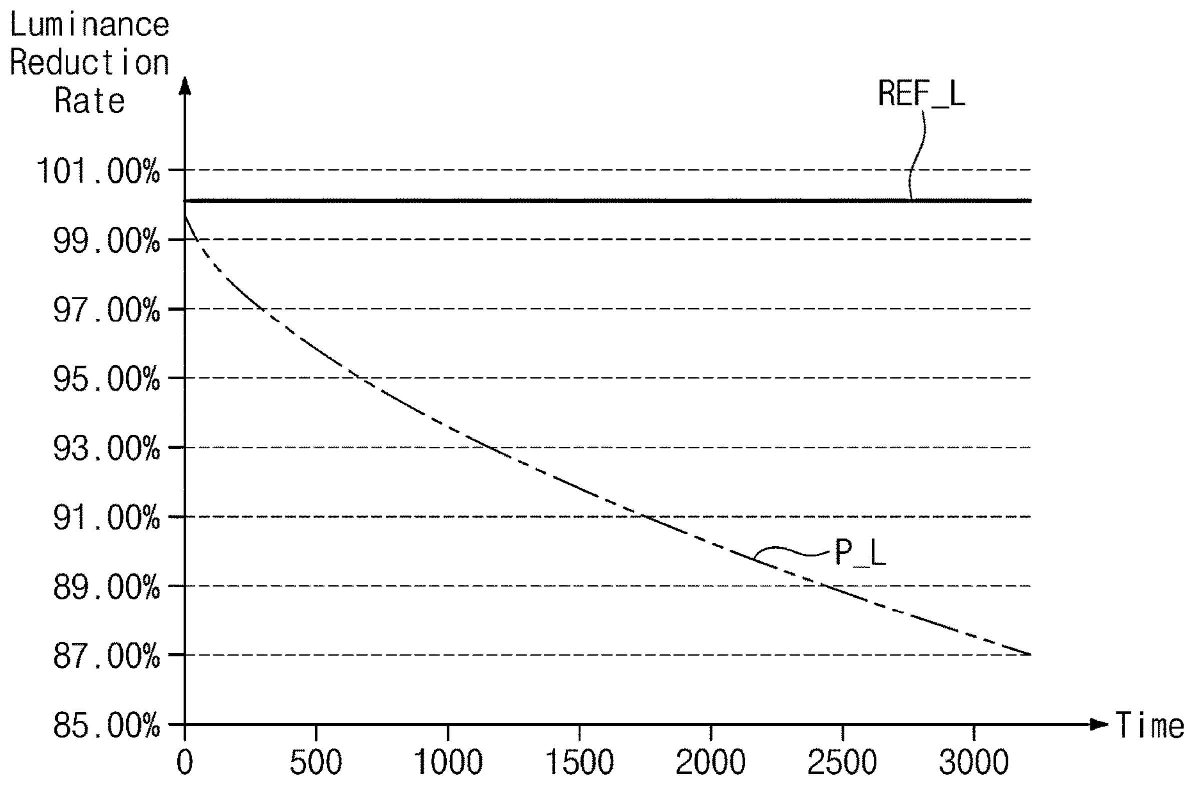
FIG. 5 is a diagram illustrating a change in luminance of a pixel.

FIG. 5 is a diagram illustrating a change in luminance of a pixel.

Referring to FIG. 5, deterioration of the pixel PXij (refer to FIG. 4) changes the luminance of light output from the LED LD.

As illustrated in FIG. 5, it may be seen that a pixel luminance P_L gradually decreases compared to a reference luminance REF_L as the operating time of the pixel PXij increases.

The operating time of the pixel PXij may be calculated by accumulating the image data signals DATA provided from the driving controller 100 to the data driving circuit 200. The driving controller 100 of the display module DM may predict a luminance change based on the image data signal DATA to be provided to the pixel PXij, and then may output the image data signal DATA obtained by compensating for the image signal RGB by a compensation value corresponding to the predicted luminance change.

Figure 6:
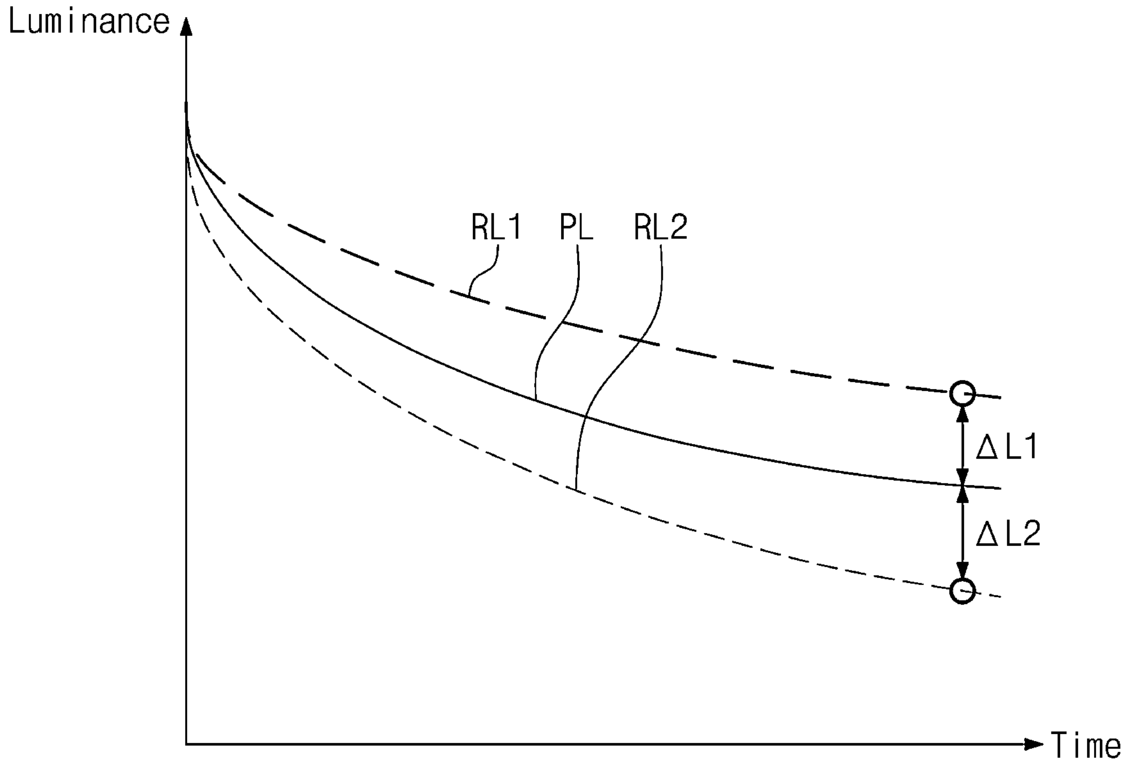
FIG. 6 is a view illustrating a result of predicting a luminance change of a pixel.

FIG. 6 is a view illustrating a result of predicting a luminance change of a pixel.

Referring to FIG. 6, the display module DM (refer to FIG. 3) may predict that a luminance change according to an operating time of the pixel PXij (refer to FIG. 4) corresponds to a curve PL.

However, when the actual luminance change of the pixel PXij corresponds to a curve RL1, there is an error corresponding to a difference value ΔL1 between the predicted luminance and the actual luminance. In this case, the predicted luminance of the pixel PXij is lower than the actual luminance, and thus the image signal RGB may be overcompensated.

When the actual luminance change of the pixel PXij corresponds to a curve RL2, there is an error corresponding to a difference value ΔL2 between the predicted luminance and the actual luminance. In this case, the predicted luminance of the pixel PXij is higher than the actual luminance, and thus the image signal RGB may be insufficiently compensated.

In other words, it is difficult to compensate for an image sticking only by predicting the deterioration of the pixel PXij and compensating for the image signal RGB based on the degree of the predicted deterioration.

Figure 7:
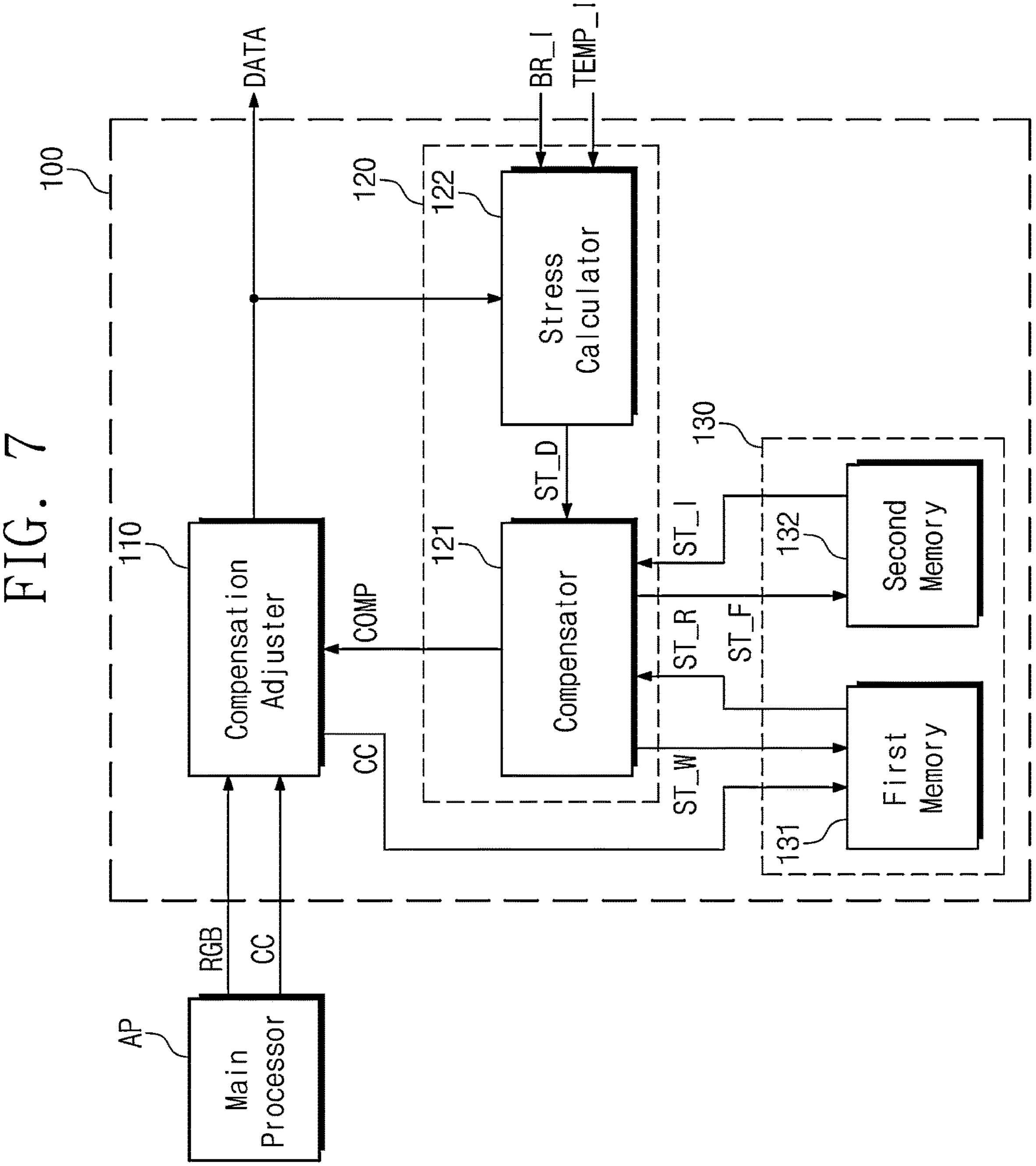
FIG. 7 is a block diagram illustrating an embodiment of a driving controller.

FIG. 7 is a block diagram illustrating an embodiment of a driving controller.

Referring to FIG. 7, the driving controller 100 includes a compensation adjuster 110, a compensation circuit 120, and a memory 130.

The compensation circuit 120 calculates cumulative stress based on the image data signal DATA and outputs an image-sticking compensation signal COMP. The compensation circuit 120 includes a compensator 121 and a stress calculator 122.

The stress calculator 122 calculates pixel stress based on the image data signal DATA, and then provides stress data ST_D to the compensator 121. In an embodiment, the stress calculator 122 may determine a stress level depending on a grayscale level of the image data signal DATA. In an embodiment, the stress calculator 122 may output the stress data ST_D based on external environments (e.g., information about ambient temperature, ambient luminance, or the like) as well as the image data signal DATA. The second electronic module EM2 illustrated in FIG. 2 may further include a thermometer for measuring the ambient temperature, a luminance meter for measuring the ambient luminance, or the like.

In an embodiment, the stress calculator 122 may receive pixel deterioration information from the pixels PX shown in FIG. 3 instead of the image data signal DATA, and may output the stress data ST_D based on the pixel deterioration information.

The stress calculator 122 may calculate the pixel stress based on the image data signal DATA, luminance information BR_I and temperature information TEMP_I and may output the stress data ST_D.

The compensator 121 outputs the image-sticking compensation signal COMP based on the stress data ST_D from the stress calculator 122 and the cumulative stress from the memory 130.

The memory 130 may store the cumulative stress. The memory 130 may include a first memory 131 and a second memory 132. In an embodiment, the first memory 131 may be a flash memory, and the second memory 132 may be a static random access memory ("SRAM").

The compensator 121 may calculate cumulative stress ST_F by adding the stress data ST_D and initial cumulative stress ST_I stored in the second memory 132 and may output the image-sticking compensation signal COMP based on the cumulative stress ST_F.

In an embodiment, the compensator 121 may calculate a compensation value according to the cumulative stress ST_F by a predetermined equation. In an embodiment, the compensator 121 may calculate the compensation value according to the cumulative stress ST_F using a predetermined lookup table. The lookup table may be stored in one of the first memory 131 and the second memory 132. The compensator 121 may output the image-sticking compensation signal COMP corresponding to the calculated compensation value.

The cumulative stress ST_F calculated by the compensator 121 may be stored in the second memory 132. Whenever the cumulative stress ST_F is changed, the compensator 121 may store the cumulative stress ST_F in the second memory 132.

The compensator 121 may periodically store the cumulative stress ST_F as a first stress signal ST_W in the first memory 131 every predetermined time (e.g., several to tens of minutes). Moreover, when the display module DM is powered off, the compensator 121 may store the final cumulative stress ST_F as the first stress signal ST_W in the first memory 131. When the display module DM is powered on, the compensator 121 may read out a second stress signal ST_R from the first memory 131.

The compensation adjuster 110 receives the image signal RGB and an image-sticking correction signal CC from the main processor AP. The compensation adjuster 110 outputs the image data signal DATA obtained by correcting the image signal RGB based on the image-sticking correction signal CC and the image-sticking compensation signal COMP from the compensator 121. In an embodiment, the compensation adjuster 110 determines a compensation value CV based on the image-sticking correction signal CC and the image-sticking compensation signal COMP from the compensator 121 and then outputs the image data signal DATA obtained by correcting the image signal RGB by the determined compensation value CV.

The compensation adjuster 110 may determine the compensation value CV by Equation 1 below.

$$CV = \mathrm{COMP} \times (CC/AR) \quad \text{[Equation 1]}$$

In Equation 1, AR denotes a correction reference value. In an embodiment, the correction reference value AR may be 128, and the image-sticking correction signal CC may have a value from 0 to 256, for example. In this case, the compensation value CV may be selected from a range between about 0 percent (%) and about 200% of the image-sticking compensation signal COMP.

The compensation adjuster 110 may store the image-sticking correction signal CC provided from the main processor AP in the first memory 131. In an embodiment, the image-sticking correction signal CC may further include user manipulation information. In an embodiment, the user manipulation information may include information such as a time, at which a user's manipulation is performed, and a range in which an image sticking is corrected.

FIGS. 8A to 8D illustrate an image-sticking correction image displayed on an electronic device, in an image-sticking correction mode.

First of all, referring to FIGS. 7 and 8A to 8C, in an image-sticking correction mode, the main processor AP may provide the display module DM with the image signal RGB corresponding to an image-sticking correction image. An image-sticking correction image may be displayed in the image area DD-DA of the electronic device ED.

The image-sticking correction image may include a control window CW1. Pattern selection buttons C1, C2, and C3, a save button C4, and slide bars SB1, SB2, and SB3 may be displayed in the control window CW1.

The pattern selection buttons C1, C2, and C3 may be buttons for selecting first to third color patterns PTN1, PTN2, and PTN3. In an embodiment, the first to third color patterns PTN1, PTN2, and PTN3 may include a red color pattern, a green color pattern, and a blue color pattern, respectively. However, the invention is not limited thereto, and the first to third color patterns PTN1, PTN2, and PTN3 may correspond to colors different from red, green and blue colors.

The pixels PX shown in FIG. 3 may include first to third color pixels. The first color pattern PTN1 may be a pattern in which first color pixels emit light from among the pixels PX. The second color pattern PTN2 may be a pattern in which second color pixels emit light from among the pixels PX. The third color pattern PTN3 may be a pattern in which third color pixels emit light from among the pixels PX.

A user may adjust the image-sticking compensation of first to third color by moving the slide bars SB1, SB2, and SB3 to the left or the right in FIGS. 8A to 8D. In an embodiment, it is described that the user adjusts the image-sticking compensation of the first to third color by the slide bars SB1, SB2, and SB3, but the invention is not limited thereto. The user interface screen displayed in an image-sticking correction image may be variously changed. In an embodiment, the user may enter values for adjusting the image-sticking compensation of the first to third color in various manners by an input device such as a keyboard, a mouse, or a touch pen.

Figure 8A:
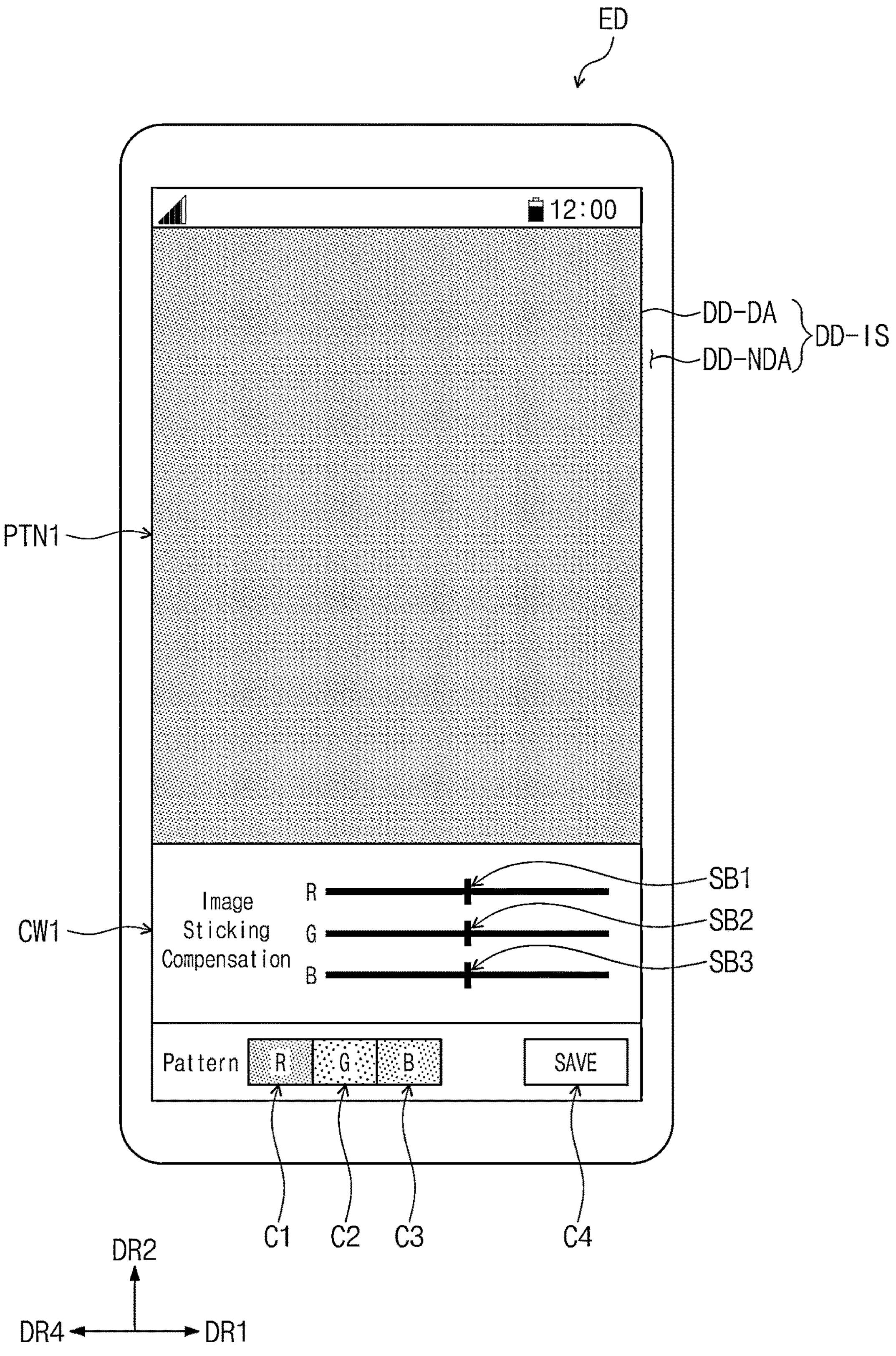
FIGS. 8A to 8D illustrate an image-sticking correction image displayed on an electronic device, in an image-sticking correction mode.

When the user selects (touches) the pattern selection button C1 corresponding to the first color in the control window CW1, the main processor AP provides the image signal RGB to the display module DM such that the first color pixels among the pixels PX are capable of emitting light. Accordingly, as shown in FIG. 8A, the first color pattern PTN1 corresponding to a red color may be displayed in the image area DD-DA.

When some of the first color pixels among the pixels PX are deteriorated, spots or image sticking may appear in a portion of the first color pattern PTN1. The user may move the slide bar SB1 in the first direction DR1 or a fourth direction DR4 while viewing the first color pattern PTN1.

In an embodiment, when the user moves the slide bar SB1 in the first direction DR1, a value corresponding to the first color in the image-sticking correction signal CC may increase. When the user moves the slide bar SB1 in the fourth direction DR4, the value corresponding to the first color in the image-sticking correction signal CC may decrease. In an embodiment, the value corresponding to the first color in the image-sticking correction signal CC may be changed from 0 to 256 by moving the slide bar SB1, for example.

The main processor AP provides the display module DM with the image-sticking correction signal CC corresponding to image-sticking correction information entered by the user's manipulation.

The display module DM may output the image data signal DATA by compensating for and correcting an image sticking of the image signal RGB based on the image-sticking correction signal CC received from the main processor AP. Accordingly, the first color pattern PTN1, of which the image sticking is adjusted by the user's manipulation, may be displayed in the image area DD-DA.

When the user presses the save button C4, an image-sticking correction operation for the first color pattern PTN1 may be terminated. An image-sticking correction change value (i.e., the image-sticking correction signal CC) for the first color pattern PTN1 may be stored in the memory MM shown in FIG. 2.

Figure 8B:
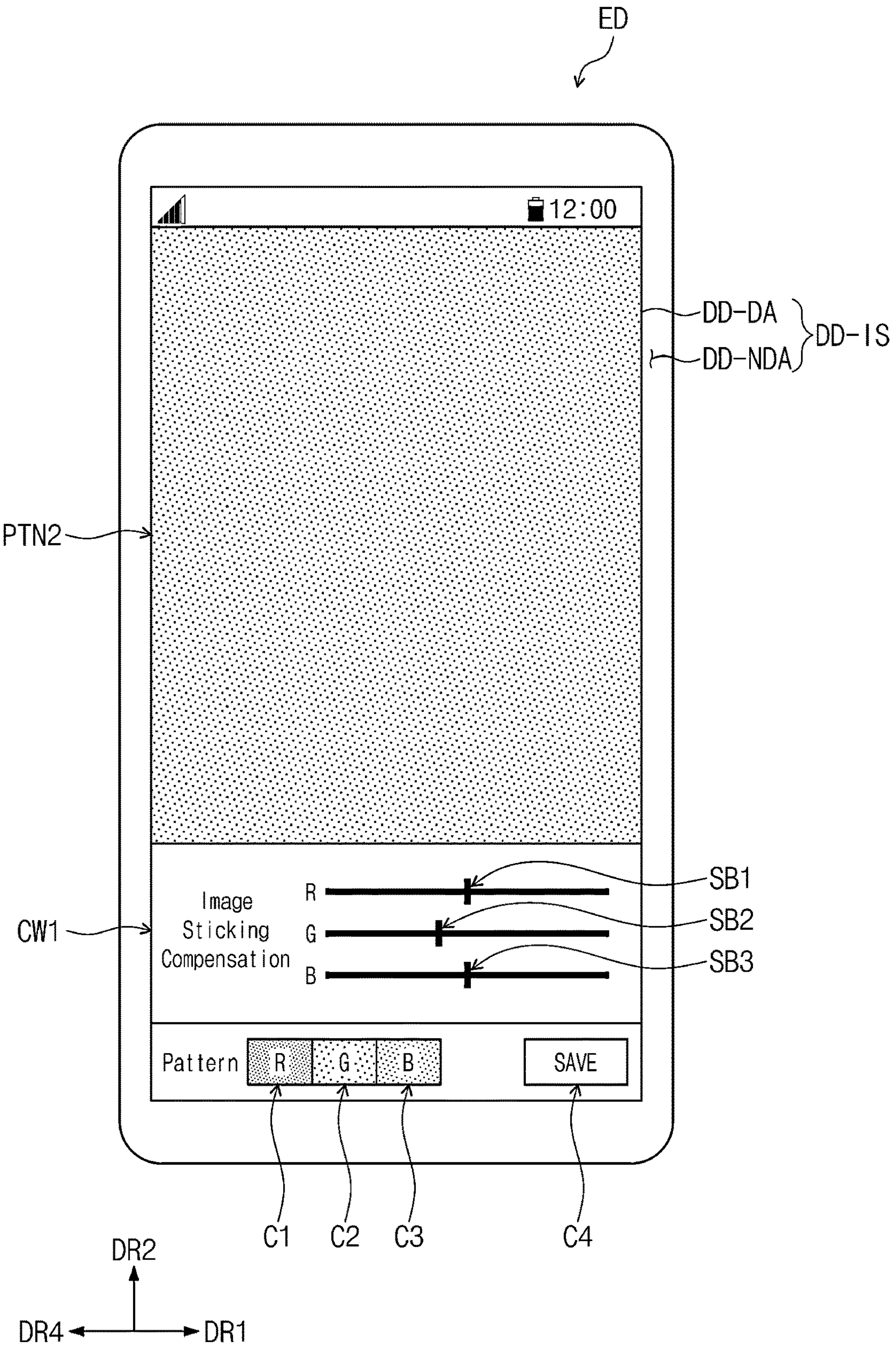

When the user selects (touches) the pattern selection button C2 corresponding to the second color in the control window CW1, as shown in FIG. 8B, the second color pattern PTN2 corresponding to a green color may be displayed in the image area DD-DA.

When some of the second color pixels among the pixels PX are deteriorated, spots or image sticking may appear in a portion of the second color pattern PTN2. The user may move the slide bar SB2 in the first direction DR1 or the fourth direction DR4 while viewing the second color pattern PTN2.

In an embodiment, when the user moves the slide bar SB2 in the first direction DR1, a value corresponding to the second color in the image-sticking correction signal CC may increase. When the user moves the slide bar SB2 in the fourth direction DR4, the value corresponding to the second color in the image-sticking correction signal CC may decrease. In an embodiment, the value corresponding to the second color in the image-sticking correction signal CC may be changed from 0 to 256 by moving the slide bar SB2, for example.

The main processor AP provides the display module DM with the image-sticking correction signal CC corresponding to image-sticking correction information entered by the user's manipulation.

The display module DM may output the image data signal DATA by compensating for and correcting an image sticking of the image signal RGB based on the image-sticking correction signal CC received from the main processor AP. Accordingly, the second color pattern PTN2, of which the image sticking is adjusted by the user's manipulation, may be displayed in the image area DD-DA.

When the user presses the save button C4, an image-sticking correction operation for the second color pattern PTN2 may be terminated. The image-sticking correction change value (i.e., the image-sticking correction signal CC) for the second color pattern PTN2 may be stored in the memory MM shown in FIG. 2.

Figure 8C:
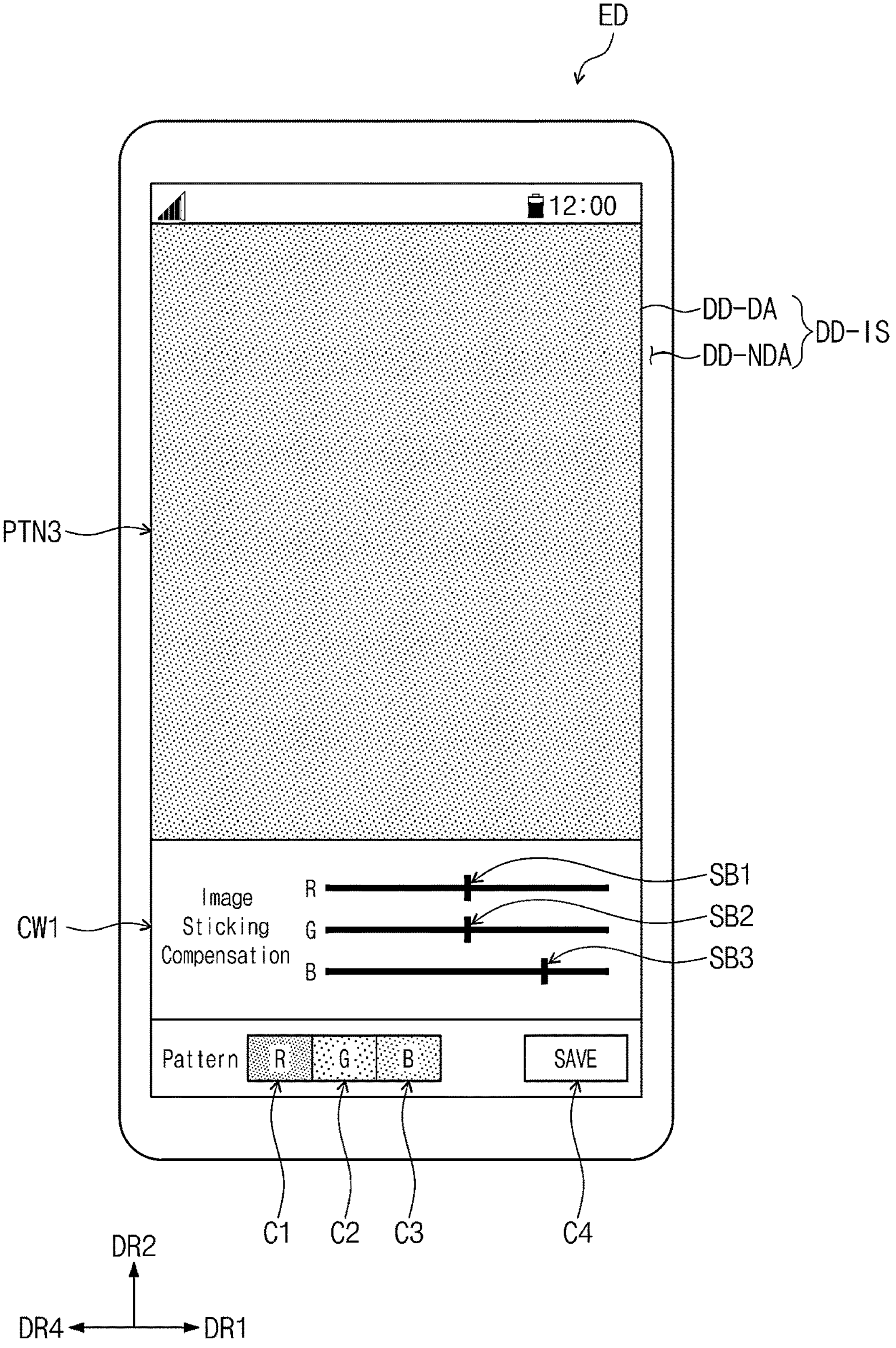

When the user selects (touches) the pattern selection button C3 corresponding to the third color in the control window CW1, as shown in FIG. 8C, the third color pattern PTN3 corresponding to the blue color may be displayed in the image area DD-DA.

When some of the third color pixels among the pixels PX are deteriorated, spots or image sticking may appear in a portion of the third color pattern PTN3. The user may move the slide bar SB3 in the first direction DR1 or a fourth direction DR4 while viewing the third color pattern PTN3.

In an embodiment, when the user moves the slide bar SB3 in the first direction DR1, a value corresponding to the third color in the image-sticking correction signal CC may increase. When the user moves the slide bar SB3 in the fourth direction DR4, the value corresponding to the third color in the image-sticking correction signal CC may decrease. In an embodiment, the value corresponding to the third color in the image-sticking correction signal CC may be changed from 0 to 256 by moving the slide bar SB3, for example.

The main processor AP provides the display module DM with the image-sticking correction signal CC corresponding to image-sticking correction information entered by the user's manipulation.

The display module DM may output the image data signal DATA by compensating for and correcting an image sticking of the image signal RGB based on the image-sticking correction signal CC received from the main processor AP. Accordingly, the third color pattern PTN3, of which the image sticking is adjusted by the user's manipulation, may be displayed in the image area DD-DA.

When the user presses the save button C4, an image-sticking correction operation for the third color pattern PTN3 may be terminated. An image-sticking correction change value (i.e., the image-sticking correction signal CC) for the third color pattern PTN3 may be stored in the memory MM shown in FIG. 2.

Figure 8D:
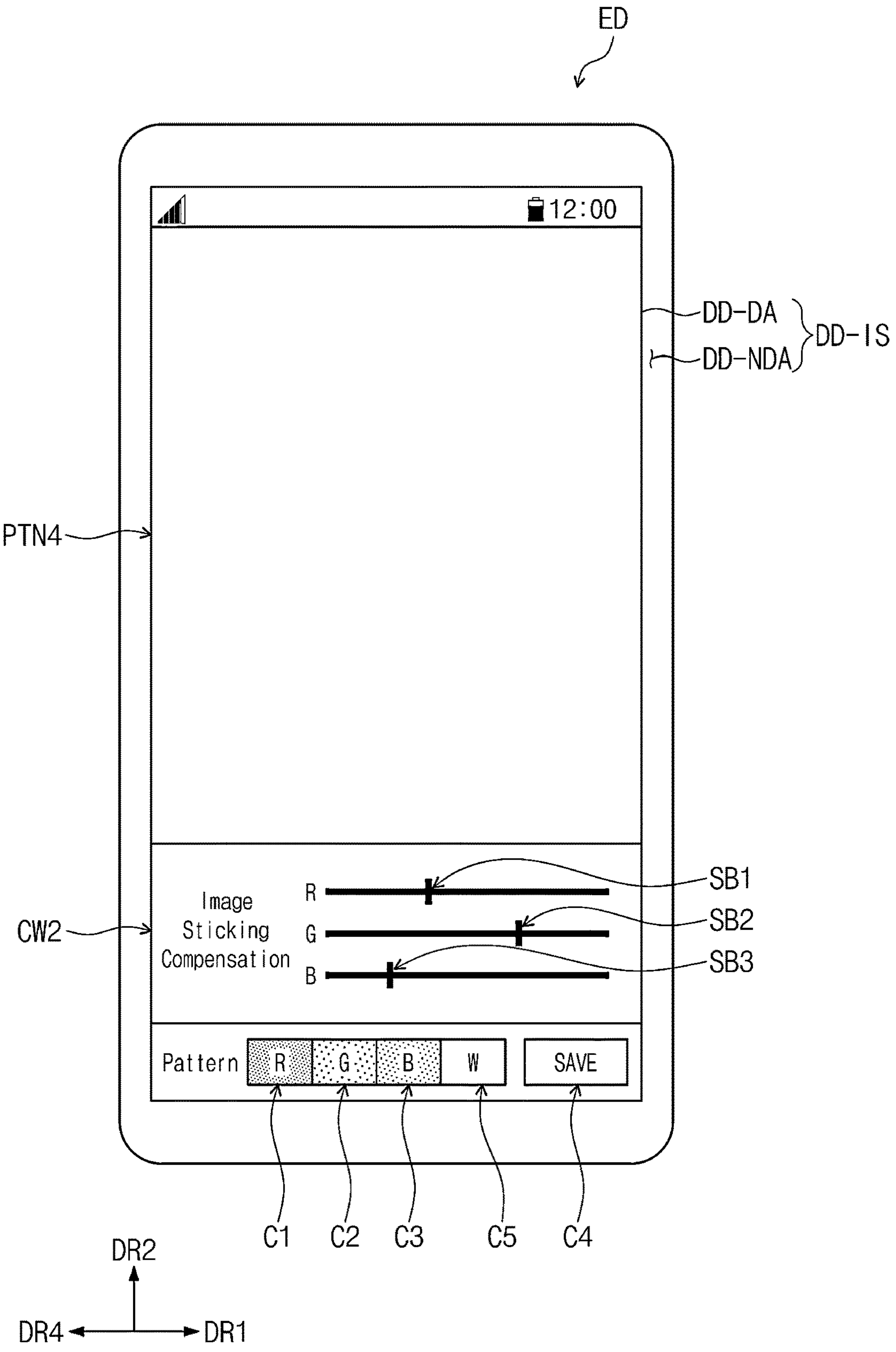

The pattern selection buttons C1, C2, and C3, the save button C4, the slide bars SB1, SB2, and SB3 are displayed in the control window CW2 shown in FIG. 8D in the same manner as the control window CW1 shown in FIGS. 8A to 8C. In addition, a pattern selection button C5 is further displayed in the control window CW2.

When the user selects (touches) the pattern selection button C5 in the control window CW2, the main processor AP provides the image signal RGB to the display module DM such that the first color pixels, the second color pixels, and the third color pixels are capable of emitting light. Accordingly, as shown in FIG. 8D, a fourth color pattern PTN4 corresponding to a white color may be displayed in the image area DD-DA. However, the invention is not limited thereto, and the fourth color pattern PTN4 may correspond to a different color from a white color when the first to third color patterns PTN1, PTN2, and PTN3 correspond to colors different from red, green and blue colors.

When some of the first color pixels among the pixels PX are deteriorated, stains or image sticking of the first color are displayed in the fourth color pattern PTN4. When some of the second color pixels among the pixels PX are deteriorated, stains or image sticking of the second color are displayed in the fourth color pattern PTN4. When some of the third color pixels among the pixels PX are deteriorated, stains or image sticking of the third color are displayed in the fourth color pattern PTN4. The user may move each of the slide bars SB1, SB2, and SB3 in the first direction DR1 or the fourth direction DR4 while viewing the fourth color pattern PTN4.

In an embodiment, when the user moves the slide bars SB1, SB2, and SB3 in the first direction DR1, values corresponding to the first to third colors in the image-sticking correction signal CC may increase. When the user moves the slide bars SB1, SB2, and SB3 in the fourth direction DR4, values corresponding to the first to third colors in the image-sticking correction signal CC may decrease.

The main processor AP provides the display module DM with the image-sticking correction signal CC corresponding to image-sticking correction information entered by the user's manipulation.

The display module DM may output the image data signal DATA by compensating for and correcting an image sticking of the image signal RGB based on the image-sticking correction signal CC received from the main processor AP. Accordingly, the fourth color pattern PTN4, of which the image sticking is adjusted by the user's manipulation, may be displayed in the image area DD-DA.

When the user presses the save button C4, an image-sticking correction operation for the fourth color pattern PTN4 may be terminated. An image-sticking correction change value (i.e., the image-sticking correction signal CC) for the fourth color pattern PTN4 may be stored in the memory MM shown in FIG. 2.

In an embodiment of Equation 1, the compensation value CV may be determined depending on ranges of the correction reference value AR and the image-sticking correction signal CC. In an embodiment, the correction reference value AR may be 128, and the image-sticking correction signal CC may have a value from 0 to 256, for example. In this case, the compensation value CV may be selected from a range between about 0% and about 200% of the image-sticking compensation signal COMP.

However, when there is a need to restrict the user's correction range, the image-sticking correction signal CC may have a value from 64 to 192 although the correction reference value AR is 128. In this case, the compensation value CV may be selected from a range between about 50% and about 150% of the image-sticking compensation signal COMP.

When the user presses the save button C4, image-sticking correction change values (i.e. the image-sticking correction signal CC) respectively corresponding to the first to fourth color patterns PTN1 to PTN4 shown in FIGS. 8A to 8D may be transmitted to the display module DM. The main processor AP may include user manipulation history information as well as the image-sticking correction value changed by the user's manipulation in the image-sticking correction signal CC and then may provide the image-sticking correction signal CC to the display module DM. The display module DM may store the image-sticking correction signal CC including the user manipulation history in the first memory 131.

Figure 9:
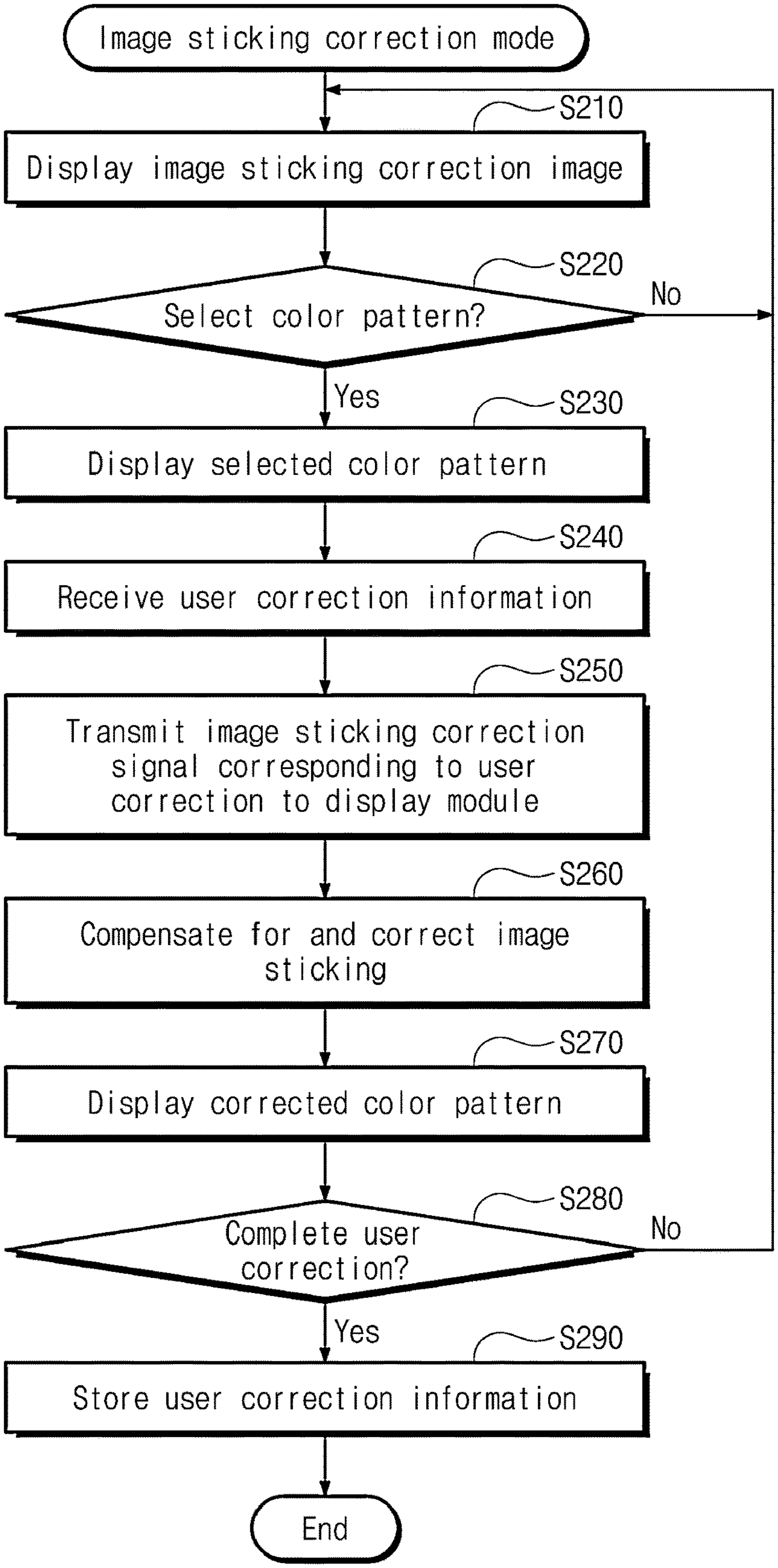
FIG. 9 is a flowchart illustrating an embodiment of an image-sticking correction operation of an electronic device, according to the invention.

FIG. 9 is a flowchart illustrating an embodiment of an image-sticking correction operation of an electronic device, according to the invention.

For convenience of description, the image-sticking correction operation of the electronic device ED will be described with reference to the main processor AP and the driving controller 100 of the display module DM shown in FIG. 7, but the invention is not limited thereto.

Referring to FIGS. 7 and 9, in an image-sticking correction mode, the main processor AP may provide the display module DM with the image signal RGB corresponding to an image-sticking correction image. The image-sticking correction image may be displayed in the image area DD-DA of the electronic device ED (operation S210).

The image-sticking correction image may include one of the control windows CW1 and CW2 and one of the first to fourth color patterns PTN1, PTN2, PTN3, and PTN4, which are shown in FIGS. 8A to 8D.

A user may select a color pattern to be displayed in the image area DD-DA by the pattern selection buttons C1, C2, C3, and C5. When the user selects the color pattern to be displayed in the image area DD-DA by the pattern selection buttons C1, C2, C3, and C5 (operation S220), the color pattern selected from the first to fourth color patterns PTN1, PTN2, PTN3, and PTN4 may be displayed in the image area DD-DA (operation S230).

While viewing the color pattern displayed in the image area DD-DA, the user may adjust the image-sticking compensation of first to third colors by moving the slide bars SB1, SB2, and SB3 to the left or the right. User correction information entered by the user by the slide bars SB1, SB2, and SB3 may be provided to the main processor AP (operation S240).

The main processor AP provides the display module DM with the image-sticking correction signal CC corresponding to the image-sticking correction information entered by the user's manipulation (operation S250).

The display module DM may output the image data signal DATA by compensating for and correcting an image sticking of the image signal RGB based on the image-sticking correction signal CC received from the main processor AP (operation S260). Accordingly, the color pattern, of which the image sticking is adjusted by the user's manipulation, may be displayed in the image area DD-DA (operation S270).

When the user presses the save button C4, the main processor AP may determine that the user's image-sticking correction operation is completed (operation S280). When the user does not press the save button C4 in operation S280, the main processor AP may return to operation S210 and then may maintain the image-sticking correction mode.

When the user's image-sticking correction operation is completed, the main processor AP stores user correction information (e.g. the image-sticking correction signal CC) (operation S290). The image-sticking correction signal CC may be stored in the memory MM shown in FIG. 2.

The main processor AP may provide the display module DM with the image-sticking correction signal CC stored in the memory MM, periodically or when the display module DM is powered on.

In an embodiment, when the main processor AP provides the image-sticking correction signal CC to the display module DM, the image-sticking correction signal CC may be stored in the first memory 131 of the driving controller 100.

Although described above with reference to a preferred embodiment of the invention, it will be understood by those skilled in the art that various modifications and changes may be made in the disclosure without departing from the spirit and scope of the invention as set forth in the claims below. Accordingly, the technical scope of the invention should not be limited to the contents described in the detailed description of the specification but should be defined by the claims.

A display module of an electronic device having a configuration may provide a display panel with an image data signal obtained by compensating for deterioration of a pixel based on deterioration information. In particular, the display module may adjust the image data signal based on an image-sticking correction signal provided by a user's manipulation. Accordingly, a display quality of the display module in the electronic device may be improved.

While the invention has been described with reference to embodiments thereof, it will be apparent to those of ordinary skill in the art that various changes and modifications may be made thereto without departing from the spirit and scope of the invention as set forth in the following claims.

What is claimed is:

1. An electronic device comprising:

a main processor which provides an image signal and an image-sticking correction signal which includes a plurality of values for each of a plurality of colors so that values, among the plurality of values, respectively corresponding to the plurality of colors are inputted by a user manipulation;

a display module which receives the image signal and the image-sticking correction signal and outputs an image data signal obtained by compensating for the image signal, the display module including:

a compensation circuit which outputs an image-sticking compensation signal;

a compensation adjuster which outputs values of the image-sticking compensation signal and the image data signal which is obtained by correcting the image signal based on the image-sticking correction signal and the image-sticking compensation signal; and a memory which receives and stores the values of the image-sticking compensation signal inputted by the user manipulation; and a display panel including a display area, wherein an image-sticking correction image displaying at least one color pattern which is selected by a user manipulation and changes according to a change of the values of the image-sticking compensation signal inputted by the user manipulation is displayed in the display module, and the at least one color pattern and a control window through which at least one of the user manipulation which inputs the values and the user manipulation which selects the at least one color pattern is performed are simultaneously displayed in the display area.

2. The electronic device of claim 1, wherein the compensation circuit calculates cumulative stress based on the image data signal and outputs the image-sticking compensation signal corresponding to the cumulative stress, and the memory stores the cumulative stress.

3. The electronic device of claim 2, wherein the compensation circuit includes:

a stress calculator which calculates pixel stress based on the image data signal; and a compensator which calculates the image-sticking compensation signal based on the pixel stress and the cumulative stress.

4. The electronic device of claim 3, wherein the memory includes a first memory and a second memory, wherein the compensator stores a sum of the pixel stress and initial cumulative stress stored in the second memory, as the cumulative stress, in the second memory, and wherein the compensator periodically stores the cumulative stress in the first memory.

5. The electronic device of claim 4, wherein the first memory is a flash memory, and wherein the second memory is a static random access memory.

6. The electronic device of claim 5, wherein the compensation adjuster stores the image-sticking correction signal in the first memory.

7. The electronic device of claim 5, wherein the image-sticking correction signal further includes user manipulation information, and wherein the compensation adjuster stores the image-sticking correction signal including the user manipulation information in the first memory.

8. The electronic device of claim 3, wherein the stress calculator calculates the pixel stress based on the image data signal and external environment information.

9. The electronic device of claim 1, wherein the compensation adjuster outputs the image data signal obtained by correcting the image signal based on a compensation value, wherein the compensation value is calculated based on a following equation:

$$CV = \mathrm{COMP} \times (CC/AR),$$

where CV denotes the compensation value, COMP denotes the image-sticking compensation signal, CC denotes the image-sticking correction signal, and AR denotes a correction reference value.

10. The electronic device of claim 1, wherein the image-sticking correction signal includes a first correction signal corresponding to a first color.

11. A display device comprising:

a display panel including a display area including a pixel;

a driving controller which receives an image signal and an image-sticking correction signal which includes a plurality of values for each of a plurality of colors so that values, among the plurality of values, respectively corresponding to the plurality of colors are inputted by a user manipulation, and outputs an image data signal obtained by compensating for the image signal, the driving controller including:

a compensation circuit which outputs an image-sticking compensation signal;

a compensation adjuster which outputs a value of the image-sticking compensation signal and the image data signal which is obtained by correcting the image signal based on the image-sticking correction signal and the image-sticking compensation signal; and a memory which receives and stores the value of the image-sticking compensation signal inputted by the user manipulation; and a data driving circuit which provides the pixel with a data signal corresponding to a value of the image data signal, wherein an image-sticking correction image displaying at least one color pattern which is selected by a user manipulation and changes according to a change of the value of the image-sticking compensation signal inputted by the user manipulation is displayed in the display panel, and the at least one color pattern and a control window through which at least one of the user manipulation which inputs the values and the user manipulation which selects the at least one color pattern is performed are simultaneously displayed in the display area.

12. The display device of claim 11, wherein the compensation circuit calculates cumulative stress based on the image data signal and outputs the image-sticking compensation signal corresponding to the cumulative stress, and wherein the memory stores the cumulative stress.

13. The display device of claim 12, wherein the compensation circuit includes:

a stress calculator which calculates pixel stress based on the image data signal; and a compensator which calculates the image-sticking compensation signal based on the pixel stress and the cumulative stress.

14. The display device of claim 13, wherein the memory includes a first memory and a second memory, wherein the compensator stores a sum of the pixel stress and initial cumulative stress stored in the second memory, as cumulative stress, in the second memory, and wherein the compensator periodically stores the cumulative stress in the first memory.

15. The display device of claim 14, wherein the image-sticking correction signal further includes user manipulation information, and wherein the compensation adjuster stores the image-sticking correction signal including the user manipulation information in the first memory.

16. The display device of claim 11, wherein the compensation adjuster outputs the image data signal obtained by correcting the image signal based on a compensation value, wherein the compensation value is calculated based on a following equation:

$$CV = \mathrm{COMP} \times (CC/AR)$$

where CV denotes the compensation value, COMP denotes the image-sticking compensation signal, CC denotes the image-sticking correction signal, and AR denotes a correction reference value.

17. An operating method of an electronic device, the method comprising:

displaying, in a display module, an image-sticking correction image, comprising simultaneously displaying at least one color pattern and a control window configured to receive a user manipulation which selects the at least one color pattern and to receive at least one user manipulation which inputs selection of a plurality of values for each of a plurality of colors;

receiving image-sticking correction information by the user manipulation;

providing, by a main processor, the display module with an image signal and an image-sticking correction signal which corresponds to the image-sticking correction information that includes the plurality of values inputted by the user manipulation;

outputting, by a compensation circuit of the display module, an image-sticking compensation signal;

outputting, by a compensation adjuster of the display module, the value of the image-sticking compensation signal and an image data signal which is obtained by compensating for the image signal based on the image-sticking correction signal and the image-sticking compensation signal;

receiving and storing, by a memory, the value of the image-sticking correction signal from the compensation adjuster; and displaying an image corresponding to the image data signal.

18. The method of claim 17, wherein the outputting the image data signal includes:

calculating pixel stress based on the image data signal;

calculating cumulative stress corresponding to a sum of the pixel stress and initial cumulative stress stored in the memory; and calculating the image-sticking compensation signal corresponding to the cumulative stress, and outputting the image data signal obtained by compensating for the image signal based on the image-sticking correction signal and the image-sticking compensation signal.

19. The method of claim 18, wherein the memory includes a first memory and a second memory, wherein the calculating the cumulative stress includes:

storing the sum of the pixel stress and the initial cumulative stress stored in the second memory, as the cumulative stress, in the second memory; and periodically storing the cumulative stress in the first memory.

20. The method of claim 19, wherein the first memory is a flash memory, and wherein the second memory is a static random access memory.

21. The method of claim 20, further comprising:

storing the image-sticking correction signal in the first memory.

22. The method of claim 20, wherein the image-sticking correction signal further includes user manipulation information, and further comprising:

storing the image-sticking correction signal including the user manipulation information in the first memory.

23. The method of claim 18, wherein the calculating the pixel stress includes:

calculating the pixel stress based on the image data signal and external environment information.

24. The method of claim 17, wherein the outputting the image data signal includes:

outputting the image data signal obtained by correcting the image signal based on a compensation value, wherein the compensation value is calculated based on a following equation:

$$CV = \mathrm{COMP} \times (CC/AR),$$

where CV denotes the compensation value, COMP denotes the image-sticking compensation signal, CC denotes the image-sticking correction signal, and AR denotes a correction reference value.

25. The method of claim 17, wherein the image-sticking corrections signal includes a correction signal corresponding to the at least one color pattern.

* * * * *